J. Ames
Sizing Paper
No. 27. Reissued Oct. 22, 1840.
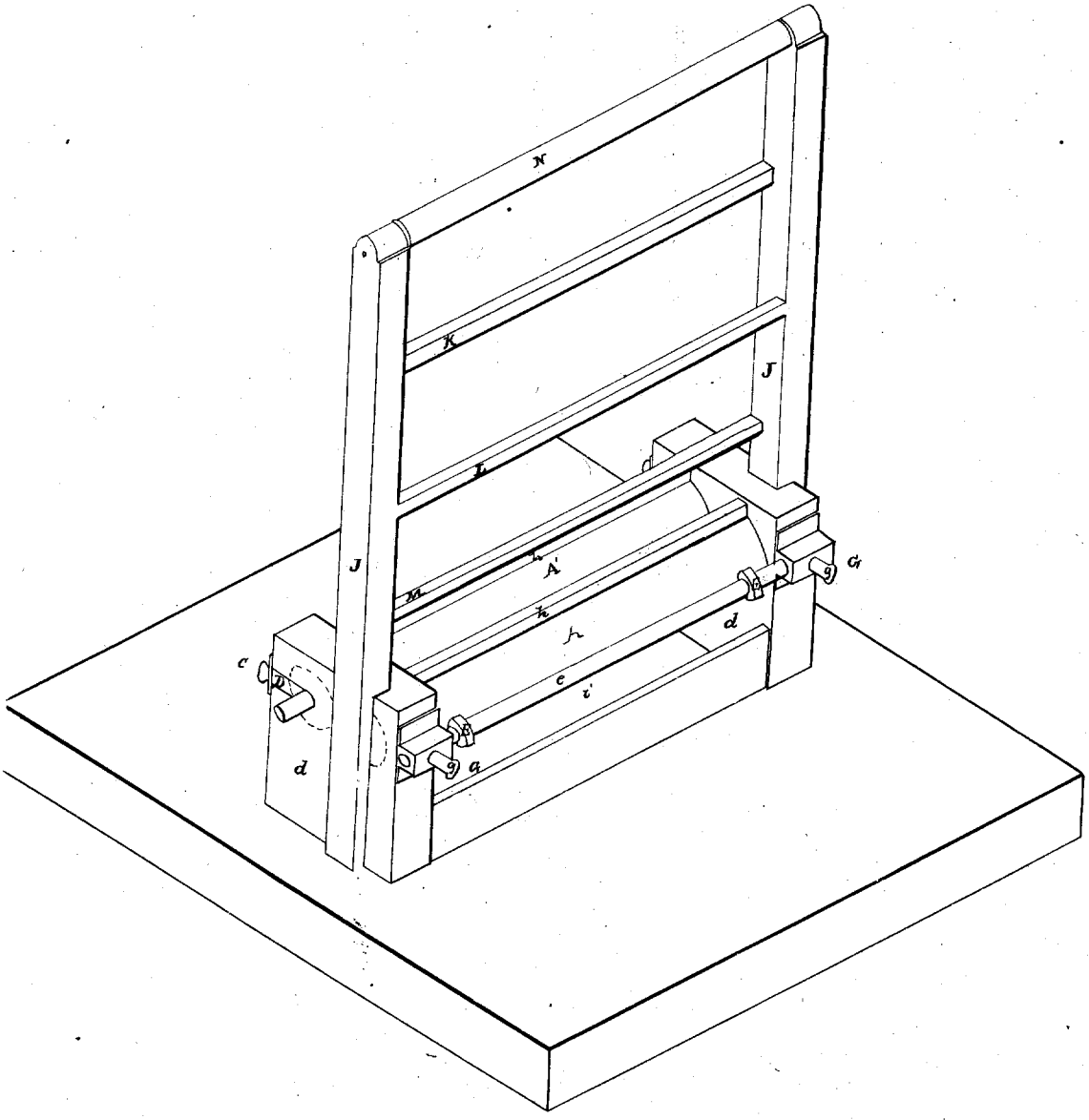
PETERS, PHOTO-LITHOGRAPHER, WASHINGTON, D. C.

Search Room

UNITED STATES PATENT OFFICE.

JOHN AMES, OF SPRINGFIELD, MASSACHUSETTS.

IMPROVEMENT IN MACHINES FOR SIZING PAPER.

Specification forming part of Letters Patent No. 495, dated December 1, 1837; Reissue No. 27, dated October 22, 1840.

*To all whom it may concern:*

I, JOHN AMES, of Springfield, in the county of Hampden and Commonwealth of Massachusetts, paper-maker, send greeting:

Whereas I, the said JOHN AMES, have invented a new and useful Improvement in the Apparatus and Machinery for and Method of Sizing Paper by Machinery, for which Letters Patent of the United States of America have been granted to me under the title of an "improvement in the machine for sizing paper," bearing date the 1st day of December, in the year of our Lord 1837, which Letters Patent are deemed inoperative by reason of a defective description and specification of the said invention arising from inadvertency, accident and mistake, without any fraudulent or deceptive intention, and have been surrendered to the Commissioner of Patents of the said United States, for the sole purpose of obtaining new Letters Patent of the said United States, to be granted to me for the same invention for the residue of the term for which the said original Letters Patent were granted, in accordance with a corrected description and specification of the same invention by me given, being a full and exact description thereof.

Now, be it known that I, the said AMES, do hereby correctly describe and specify my said invention as follows—that is to say, the drawing hereto annexed is to be taken and considered as a part of this my description and specification.

At a convenient height—say about two feet and a half from the floor—I place upon a frame two revolving cylinders contiguous to each other, in a horizontal position, so that the center of their axis may be in the same horizontal plane and parallel to each other, which cylinders are represented in the aforesaid drawing, and designated by the letters and mark A A′.

The cylinder designated by the letter and mark A′ is to be made of hard metal—brass is preferable—about five feet and a half in length and nine inches in diameter, with a smooth, even, and polished surface. The other cylinder (designated by the letter and mark A) may be made of hard wood, and is to be of the same length as the first-mentioned cylinder, and about twenty inches in diameter, or of a diameter sufficient to render it stiff and prevent it from springing when the two cylinders are pressed loosely together and in operation, and with a smooth or even surface. The diameters of these cylinders may be somewhat varied with and in proportion to their length; but they must of course be somewhat longer than the width of the sheet which is to pass between them, so as to leave a space of two or three inches at each end. The gudgeons of one of the cylinders turn on boxes fixed in the frame before mentioned. The gudgeons of the other cylinder turn in movable boxes (designated by the letter D) in the same frame, regulated by screws (designated by the letter *c*) or levers so adapted and adjusted as to press and keep the cylinder on which they act in the requisite close contact with the sheet of paper pressed against the other cylinder while these cylinders are in operation.

The paper is to be brought in a continuous sheet from the paper-machine or drying-cylinder and made to pass over a revolving cylinder or roller whose axis should be in a horizontal plane about four feet above the plane of the axis of the two first-mentioned cylinders, which roller is designated in the drawing by the letter N′, and is so placed that the sheet of paper in descending may pass over and from it with sufficient friction over a bar (designated by the letter K′ in the drawing) fixed at each end in uprights or posts, (designated by the letter J,) or in an arch, or in any convenient way, about twelve inches below, but not in the same perpendicular line, and thence further descending may pass under another bar fixed in the same frame or arch, or otherwise, designated by the letter *l*, about twelve inches below, but not in the same perpendicular line with the first-mentioned bar, with a sufficient degree of friction, and thence further descending may pass, with a sufficient degree of friction, over another bar (designated by the letter M in the drawing) about twelve inches below the bar next hereinbefore mentioned, but not in the same perpendicular line, and about twelve inches above the line of contact of the two cylinders first above mentioned with the sheet of paper, and so fixed in the posts, uprights, or arch before mentioned, or otherwise, that the sheet of paper, after passing over it, may descend perpendicularly to the line of contact of the two first-mentioned cylinders and between them. The use of these bars is by the friction of the sheet of paper upon them to render the surface of the paper smooth, even, straight, and free from folds, wrinkles, or indentations when it comes to pass between the two first-mentioned cylinders at their line of contact aforementioned, to which it is made to descend perpendicularly, so as to be sized simultaneously and equally on both sides.

The number of the bars may be more or less, according to the strength of the sheet of paper and the degree of friction which may be required to produce the intended effect. Three bars are in general deemed sufficient and no more than are useful.

Small rollers may be used instead of bars; but bars are preferable.

That part of the descending surface of the two first-mentioned cylinders above their line of contact aforesaid and next to each other, together with pieces of board or blocks having a plane surface, designated by the letter *d*, attached to the frame at each end of the cylinders, or fixed closely to the ends of the cylinders or the sides of the frame, against which boards, blocks, or sides of the frame the cylinders run, having a joint sufficiently tight to prevent the sizing from escaping, form a trough for the sizing, which is to be filled, or nearly so, by sizing to be prepared in the usual way, and introduced and supplied from time to time by tubes from a vat or cistern in a position somewhat higher that the sizing-cylinders, containing a sufficient quantity of sizing to give the requisite supply from time to time. The sides of the frame may be in close contact with the ends of the cylinders, so as to answer instead of pieces of blocks or boards.

Beneath the two first-mentioned sizing-cylinders is to be placed a trough, *i*, to receive the sizing, which from time to time passes down between these two cylinders when not in very close contact, whence it is to be pumped back into the first-mentioned trough, or into the vat or cistern, to be used over again. The sheet passes down perpendicularly through the sizing into the center of the trought first mentioned above, formed by the first-mentioned cylinders, and the pieces of board or blocks attached to the frame or fixed so as to come and bear against and make a close joint with the ends of the cylinders, and is thus simultaneously sized on both sides of the paper, and is afterwards pressed by and passes between the two first-mentioned cylinders.

By means of the dripping of the sizing through the cylinder when not in very close contact, the edges of the sheet of paper are liable, especially in cold weather, to be smeared with the sizing. To prevent this a strip of fine linen or silk about an inch in width is to be put around the wooden cylinder where the edges of the sheet pass. These strips serve to make a close joint, and to prevent the escape of any sizing near enough to touch the edges of the sheet after passing and being pressed between the first-mentioned cylinders. If both cylinders be of metal, (as they may be, although I deem it preferable to have one of them of wood,) in order to obviate the same difficulty, a shaft designated by the letter *e*, on which are placed wheels designated by the letters *f f*, with rims two or three inches wide, are to be placed near to the outer surface of that cylinder which leads off the sheet from the sizing-machine, and corresponding to the axes thereof. This shaft is to be regulated by screws (designated by the letter *g*) or by levers. The rims of the wheels, which are so placed as to correspond with the edges of the sheet of paper, are pressed by means of the screws or lever with proper force against the cylinder, which turns them by means of the friction. The edges of the paper passing between the cylinder and the rim of the wheel are thus pressed and freed from the sizing, which may have by dripping attached to them, and the sheet passes off between the cylinder and shaft and wheels.

To clean the cylinders first mentioned, and enable them to present a smooth surface continually to the sheet of paper to be pressed by them, a scraper called a "doctor," (designated by the letters *h h*,) made of wood of the length of the cylinders, with an edge about half of an inch in thickness, covered with cloth, is to be placed on each of the first-mentioned cylinders. The edges of the doctors are to be pressed upon the surface of the cylinders constantly while in operation with a sufficient degree of force to scrape off anything which may adhere thereto tending to make the surface of the cylinders rough or to impede their operation.

I claim as my invention—

1. The forming of a sizing-trough in the manner aforesaid, the sides and bottom whereof are constituted by the pressing-cylinders aforesaid, so that the sheet of paper to be sized may be drawn down vertically through the center of the trough and of the sizing therein and be wet equally and simultaneously on both sides by the sizing, and then to pass down between the same pressing-cylinders which constitute the sides and bottom of the trough and be pressed thereby, as aforesaid.

2. In combination with a trough formed as aforesaid, the employment of several bars or rollers of wood or other material placed one above the other, as aforesaid, for the purpose of causing the paper which is to be sized while it is drawn down to descend in a vertical direction from the lowest bar into the sizing and to render and keep the surface of the paper smooth, even, straight, and free from wrinkles or dents while passing through the sizing and when it comes to pass through between the pressing-cylinders, as aforesaid.

3. In combination with a trough formed as aforesaid, the apparatus aforesaid for freeing Search Room the edges of the sized paper from superfluous sizing, consisting of the shaft *e*, the two wheels *f f*, and their appurtenances, constructed and operating as aforesaid.

In testimony that this is a true and exact description and specification of my invention, I have hereto, in presence of two witnesses, whose names are hereto by them subscribed, set my hand this 2d day of October, A. D. 1840.

JOHN AMES. [L. S.]

Witnesses:
R. A. CHAPMAN,
HENRY BREWER, Jr.